March 14, 1967  W. PEARLMAN  3,308,667
TEMPERATURE DETERMINATION SYSTEM
Filed July 23, 1964
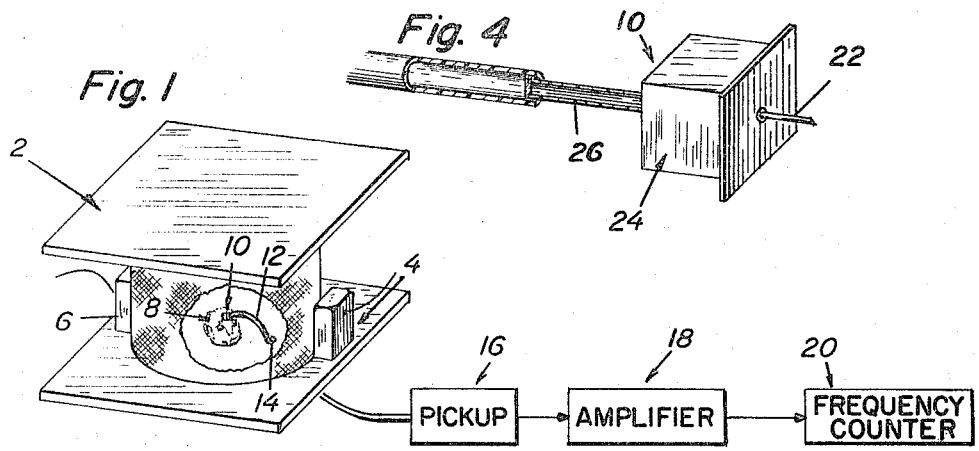
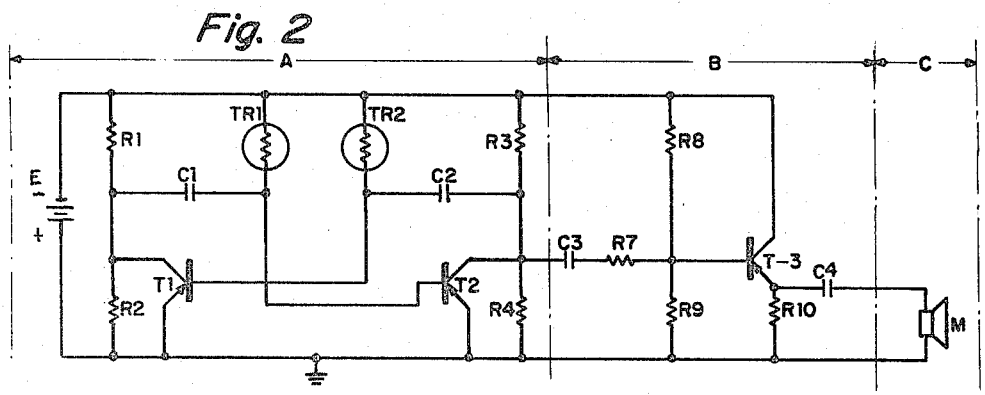
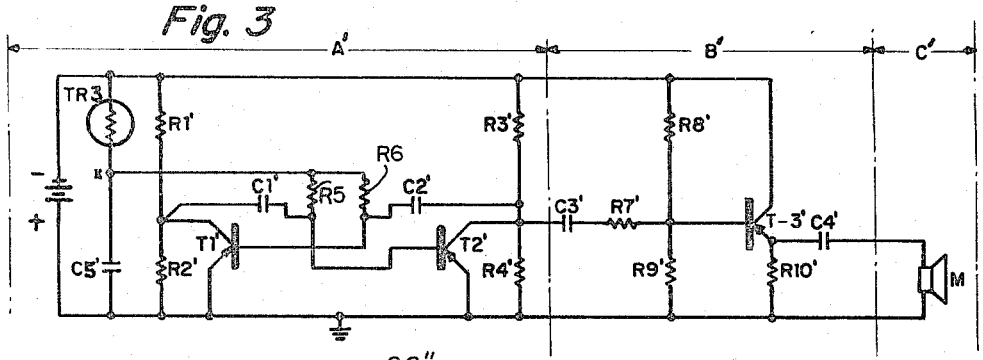
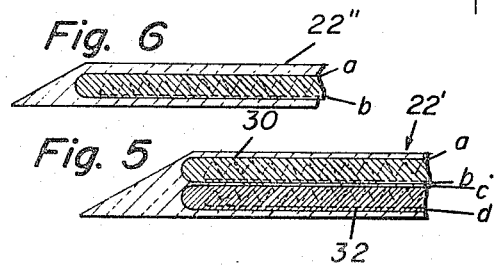
William Pearlman
INVENTOR
BY
ATTORNEYS

3,308,667
TEMPERATURE DETERMINATION SYSTEM
William Pearlman, 809 Malcolm Drive,
Silver Spring, Md. 20901
Filed July 23, 1964, Ser. No. 384,813
16 Claims. (Cl. 73—362)

The invention described herein may be manufactured and used by or for the Government of the United States of America for governmental purposes without the payment of any royalties thereon or therefor.

This invention relates generally to systems for determining temperature, and is specifically concerned with a method, apparatus and sensing means for accurately ascertaining the temperature of a given medium within an electro-magnetic field and then relaying the measured temperature to a remote location outside the field without interfering with the field itself.

In order to determine the biomedical effects of electromagnetic radiation on animals, a certain portion of the biomedical research effort has been directed to placing an animal such as, for example, a monkey, in a high-frequency field and then determining physical changes experienced by the animal. One of the physical aspects of considerable interest is the temperature variation encountered in the animal's brain as a result of the exposure to such radiation. The present invention finds particular ultlity when employed for such purpose and in such environment, and particularly when used for control purposes to provide an indication of the power adjustments required to maintain a reasonably normal temperature. Accordingly, the same is described in this connection in following portions of this specification.

However, it is to be understood that the invention is not specifically limited to use in biomedical applications but instead, can be utilized for various purposes where temperature sensing is necessary and/or where transmission of a sensed signal is to be easily achieved without interference with the characteristics of the environment of the medium being sensed.

Bearing in mind the foregoing, it is helpful to initially consider by way of example, the temperature sensing and information transfer characteristics needed to easily and yet satisfactorily sense the temperature of a monkey's brain when the monkey's head is located within a high-frequency electric field. Consistent with this example, the field may be created in a resonant cavity and the monkey's head would be located within such cavity so as to encounter the field established for the cavity.

Assuming further that the resonant cavity is operated with a so-called standard configuration and at a frequency of a few hundred megacycles, any conductors or leads extending within the cavity would necessarily act effectively as antenna, thereby disrupting the standard configuration which may be established. Moreover, within such a cavity, simple temperature sensing devices, such as for example, thermocouples, develop excessive heat under the action of the field and essentially "burn up."

Thus, to transmit the information sensed in the conventional manner by a conventional sensing means and by the use of conductors is not feasible for the purposes in question.

An alternative approach to the problem is to use a temperature sensing and transmitting means within the cavity and a receiving and converting means outside the cavity. In this instance, and again by way of example, the temperature is sensed and then converted into an electrical signal and the electrical signal is in turn used to modulate a carrier signal, preferably as a frequency modulation. The carrier signal is then transmitted from the cavity to a remote location where the information signal is separated therefrom through a conventional demodulation technique and then converted to useful information in a read-out device.

The transmission-conversion approach to the problem does not prove satisfactory in ultimate operation because of the equipment required for the sensing, transmission and conversion parts of such system.

The preceding paragraphs are not intended to present a completely exhausted discussion of all different types of prior temperature sensing techniques which might be employed for the use under consideration. Instead, such discussion is presented to illustrate the problems presented and the need for a comparatively simple and relatively inexpensive temperature sensing method and apparatus that will operate to accurately sense temperatures within a high-frequency field, such as a resonant cavity, transmit the information to a remote location outside of the field without affecting the field, and thereafter readily give the operator an accurate indication of the temperature being sensed within the field.

The primary object of the present invention is to satisfy the aforesaid need. More particularly, the present invention in its broader aspects is concerned with the provision of a relatively simple and inexpensive temperature sensing technique and system which are capable of accurately sensing temperatures within a high-frequency field and transmitting the sensed information to a location outside the field without interfering with the characteristics or configuration of the field.

Consistent with the foregoing, it is a further primary object hereof to provide such a technique and system which physically sense the temperature within the field then relay the sensed temperature by pressure variations to a location outside of the field and thereafter convert the pressure variations into electrical signals which are used to ultimately physically indicate to the operator the temperature that was sensed. In line with this aspect of the invention, additional significant objects include the following: (a) the provision of such a technique and system wherein the sensed temperatures can be ascertained accurately within fractions of a degree such as, for example, within limits of $1/100$ of a degree; (b) the provision of such a technique and system which permit the operator to determine the temperature being sensed by merely observing a digital read-out such as the conventional read-out of a frequency counter; (c) the provision of such a technique and system which can be operated and fabricated from basically conventional components so as to be available for use at minimum expense; (d) the provision of such a technique and system which permits the size of the sensing and transmitting components to be minimized so that the same do not interfere with the characteristics or configuration of an electrical field in which they are used; and (e) the provision of such a technique and system which require as the sensing element only a very small sensing probe that can easily be inserted into a given medium such as the brain of a monkey.

Notwithstanding the fact that the overall aspects of the system and technique hereof have major importance, there are certain detailed aspects of certain system components that are of primary significance. Thus, yet another primary object of the present invention is to provide a means for converting a temperature sensed by an electrical sensing means into transmittable pressure variations, preferably pressure variations of the type commonly called sound. Consistent with this important aspect of the invention, additoinal but more specific objects hereof include the following: (a) to provide such a converting means which operates to translate sensed temperatures into electrical signals having frequencies corresponding to the sensed temperature, and then to translate the electrical signals into pressure variations; (b) to provide such a converting means which essentially takes the form of a multi-vibrator circuit coupled with the temperature sensing element such that the frequency of the multi-vibrator varies with the temperature being sensed; (c) to provide such a converting means wherein the output of the multi-vibrator circuit is fed to a speaker means which translates the electrical signals into pressure signals of corresponding frequency; (d) to provide such a converting means which operates with accuracy of the order of $1/100$ of a degree; (e) to provide such a converting means wherein the temperature sensing element associated therewith can take the form of a thermistor; and (f) to provide such a converting means wherein the temperature response characteristics are linear even though the characteristics of certain circuit elements including the sensing thermistor, are non-linear.

The invention lies in the overall method, the overall system and certain of the conversion components of the system. The invention will be better understood, and objects other than those set forth above will become apparent when consideration is given to the following detailed description. Such description refers to preferred and illustrative embodiments of the invention presented in the annexed drawings.

In the drawings:

FIGURE 1 is a perspective and partially schematic view of a resonant cavity having the system hereof associated therewith;

FIGURE 2 is a schematic circuit diagram of one form of initial conversion means incorporated in the system of FIGURE 1;

FIGURE 3 is a schematic circuit diagram of the preferred form of initial conversion means incorporated in the system of FIGURE 1;

FIGURE 4 is a perspective view of a conversion means and sensing probe unit utilized in accordance herewtih;

FIGURE 5 is a longitudinal sectional view taken through one form of sensing probe used with the unit of FIGURE 4; and, FIGURE 6 is a longitudinal sectional view taken through the preferred form of sensing probe used with the unit of FIGURE 4.

Referring first to FIGURE 1, the resonant cavity shown therein is generally designated by the numeral 2. Suitable electronic components 4 and 6, illustratively are associated with the cavity to establish therein a high-frequency field. By way of example, the resonant cavity can operate at 225 to 400 megacycles and any standard configuration field can be used.

With respect to the cavity, it should be understood from the outset that the form of the cavity, operating frequency, configuration, and the like, form no part of the instant invention. Instead, the cavity 2 is presented in FIGURE 1 merely to illustrate one environment of intended use for the invention. Thus, the electronic controls and cavity construction are shown only schematically and further detail is not presented herein as to the cavity construction and operation thereof. Suffice it to say that a high-frequency field is established within the cavity.

It is within the high-frequency field that the invention operates to sense a temperature. To this end, it will be noted that a monkey's head 8 is positioned within the cavity 2. Supported on the monkey's head 8 is a temperature sensing and convering unit 10. The preferred physical appearance of the unit 10 is shown in FIGURE 4 and will be described in greater detail below.

The unit 10 is connected with a transfer tube 12 which preferably takes the form of a small diameter flexible hose made of a suitable non-conductive material, such as, a plastic formed from a synthetic resin. While the monkey's head 8, unit 10, and one end portion of the tube 12 are disposed within the confines of the interior of the cavity 2, the other end portion of the tube 12 extends through an opening 14 in the side wall of the cavity and feeds to a pick-up means 16. The pick-up means 16 in turn feeds to an amplifier 18 and the amplifier 18 feeds to a frequency counter 20. In the simplest aspects, the unit 10, as shown in FIGURE 4, includes a temperature sensing probe 22, a housing 24, containing a conversion means, and an output connection 26. The conversion means located in housing 24 is considered in greater detail with respect to the discussion of FIGURES 2 and 3 below. Such conversion means serves to convert an electrical signal into pressure variations—i.e., sound. The probe 22 actually physically senses the temperature, but the sensed temperature affects the electrical properties of an electrical component forming part of the probe. Preferably, as shown in FIGURES 5 and 6, the probe 22 either has one thermistor or two thermistors disposed therein. The probe 22′ of FIGURE 5 has a first thermistor 30 and a second thermistor 32 therein. Each of these thermistors is of the elongated glass-enclosed type commonly commercially available. The probe 22″ of FIGURE 6 is essentially the same as the probe of FIGURE 5, but it only has one such thermistor located therein and accordingly, is desirably smaller than the probe shown in FIGURE 5.

Regardless of the particular probe used, the same serves to sense the temperature of the medium in which the probe is located by imparting the temperature to the thermistor. Since a thermistor is basically a temperature-sensitive resistance, the sensed temperature causes a corresponding variation in electrical resistance between respective probe leads—i.e., the leads $a$ and $b$ of FIGURE 6, or the leads $a$–$b$ and $c$–$d$ of FIGURE 5.

As explained fully hereinafter, the variations in resistance are converted by the conversion means into sound when the conversion means takes the form of the circuits shown in either FIGURE 2 or FIGURE 3. The sound signals are transmitted through the output connection 26 (FIGURE 4) into the tube 12 and accordingly, pressure variations are established within this tube. At the outer end of the tube, the pick-up means 16, which preferably takes the form of a microphone, converts the sound or pressure signals back into electrical signals. The pick-up means can take various forms, and of course, various types of microphones can be used. Still, the pick-up means would be conventional and would merely serve to convert the pressure or sound signals into electrical signals which are then fed to a conventional amplifier 18 wherein the electrical signals are amplified and then fed to a frequency counter. The frequency counter can be of conventional type having a digital read-out since it serves to count and indicate the frequency of the electrical signals developed at the pick-up means 16.

With the foregoing explanation, it should be apparent that the temperature sensed is converted to pressure variations within the cavity 2 of FIGURE 1 and these pressure variations are then transmitted through non-conductive means to the exterior of the cavity. After reaching the exterior of the cavity, they are reconverted into electrical signals which operate a digital display. In other words, the method hereof contemplates electrically sensing the temperature of a given medium within a high-frequency field to produce first electrical signals having a frequency corresponding to the temperature sensed, converting the first electrical signals into pressure signals of corresponding frequency, transmitting the pressure signals to a location outside the field, converting the pressure signals into corresponding second electrical signals and then using the second electrical signals to operate an indicating means.

To effect the aforesaid method, conventional equipment can be used to electrically sense the temperature within the field, to transmit the pressure signals from within the field to a location outside the field, to convert the pressure signals into the second electrical signals and to indicate the second electrical signals. However, the equipment is not conventional in the conversion of the sensed temperature to pressure signals within the field. In this regard, attention is now directed to the circuits of FIGURES 2 and 3 provided by the present invention.

Referring first to FIGURE 2, it will be noted that the circuit shown therein generally includes a multi-vibrator stage A, a coupling stage B and an output stage C. The multi-vibrator stage A is more or less conventional and includes a battery E, a pair of transistors T1 and T2, and associated circuitry. Specifically, a pair of collector-supply voltage resistors R1 and R2 are coupled across the battery E and the collector of T1 is connected therebetween. Similarly, the bias resistors R3 and R4 are connected across the battery E with the collector of T2 connected therebetween. The emitters of the respective transistors are grounded, as shown. RC networks are coupled with the bases of the respective transistors. The RC network for the base of T2 includes the thermistor TR1 and the capacitor C1 whereas the RC network for the base of T1 includes the thermistor TR2 and the capacitor C2. The operation of the circuit would be generally conventional if TR1 and TR2 were fixed resistors, or at least, resistors set at predetermined values. However, with the invention, these resistors are purposely variable, and more particularly, variable with temperature. The thermistors TR1 and TR2 are the same elements as identified by the numerals 30 and 32 in FIGURE 4. Accordingly, these thermistors change their electrical characteristics with temperature and in turn, vary the frequency of operation of the circuit. This means that the frequency of operation of the multi-vibrator stage A of the circuit of FIGURE 2 varies directly with the temperature sensed by the probe 22.

Accordingly, the multi-vibrator stage A converts the temperature variations into electrical signals having frequencies directly dependent upon and related to the sensed temperature. These electrical signals are then fed into the coupling stage B connected across the output of the multi-vibrator and in turn into the output stage C which comprises a speaker (preferably a microphone connected as a speaker). The coupling stage B is conventionally designed and is included to serve as a buffer between the multi-vibrator stage and the output stage, and in a directly related aspect, to provide an impedance match for the speaker.

The transistors T1 and T2, as well as the transistor T3 in the coupling stage are of the p-n-p type, and the thermistors are preferably matched so as to have equal resistance variation with change in temperature. Although the circuit of FIGURE 2 is not limited to particular transistors, particular thermistors, and/or particular resistors, it has been found that when the components set forth in the following chart are used for the corresponding components designated in FIGURE 2, particularly satisfactory operation is achieved.

| Component designation in FIGURE 2: | Preferred value and/or type |
| --- | --- |
| R1 and R3 | 4.7K. |
| R2 and R4 | 3.9K. |
| C1 and C2 | .01 mfd. |
| M | Shure MC30J. |
| E | 2.6 volts (RM575– Mallory cells). |
| TR1 and TR2 | Fenwal GA51M2. |
| T1, T2 and T3 | Raytheon CK22B. |
| C3 | 6.8 mfd. |
| R7 | 4.7K. |
| R8 | 47K. |
| R9 | 39K. |
| R10 | 1.5K. |
| C4 | .1 mfd. |

The circuit of FIGURE 3 is connected in some respects in a similar manner to the circuit of FIGURE 2. However, and very significantly in this instance, the RC networks are not coupled directly with E+, but instead, are connected with E'— through the thermistor TR3. The thermistor TR3 is itself part of a series network including TR3 and capacitor C5' coupled directly across the battery. Two additional resistors, R5 and R6 respectively forming part of the RC networks associated with the base of T2' and T1' are incorporated. Before describing the operation of the circuit of FIGURE 3, it is to be noted that the circuit components in FIGURE 3 are designated by the same notations as used for the circuit of FIGURE 2, but each notation has been designated as a prime of the prior notation since the temperature-frequency control operation is significantly different.

Still, for example, R1' and R2' of FIGURE 3 have the same function as R1 and R2 of FIGURE 2, and a similar situation exists for the remaining components common to the respective circuits. The coupling stage B' of FIGURE 3 and the output stage C' of FIGURE 3 correspond in function identically to the respective stages of FIGURE 2, but certain component values differ as indicated in the chart below.

With the circuit of FIGURE 3, however, the need for matching thermistors is eliminated, and moreover, the probe for operating the circuit can be made smaller since only a single thermistor is used. The thermistor TR3 is common to the RC networks of both transistors T1' and T2' and thus, as the same varies in resistance, it effects an equal frequency change for the respective transistors. The multi-vibrator stage of FIGURE 3 departs from the conventional design in replacing the standard time constant resistances with respective resistors R5 and R6, by coupling these respective resistors through TR3 with E—, and by incorporating the filter capacitor C3'. This filter capacitor prevents D.C. voltage fluctuations at point X for any reason other than as caused by the fluctuations in temperature.

To clarify the above, if the voltage at point X were fixed, then the operation of the multi-vibrator stage would be somewhat conventional. However, this voltage is purposely not fixed in FIGURE 3 and instead, the base currents are varied. More specifically, in the respective networks for the transistors T1' and T2' of FIGURE 3, the base current is fixed for any given temperature but varies with changes in temperature. As the temperature increases, the resistance of the thermistor TR3 decreases so that the base current increases, and in turn, the frequency increases. The base current increase is the same for both transistors in the multi-vibrator stage because they are controlled by a single and common thermistor.

In addition to the advantages noted above which result from the use of a single thermistor, the circuit of FIGURE 3 provides a linear response. It is recognized that thermistors normally do not vary their resistance linearly with variations in temperature. Instead, the variations are expotential. However, with the circuit of FIGURE 3, the the frequency change would also be non-linear and exponential. However, with the circuit of FIGURE 3, the non-linear base response of the transistors is used to effectively counter-balance the non-linearity of the thermistor so that the resultant output is linear. This is an extremely important aspect because it permits the use of the circuit with the simplest equipment and indicating means.

With the circuit of FIGURE 3, as with the circuit of FIGURE 2, the component values can vary. However, the following components and values have been found to operate with complete satisfaction.

| Component designation in FIGURE 3: | Preferred value and/or type |
|---|---|
| C1' and C2' | .0068 m.f.d. |
| TR3 | Fenwal GA51M2. |
| R1' and R3' | 4.7K. |
| R2' and R4' | 3.9K. |
| T1, T2 and T3 | Raytheon CK22B. |
| E | 2.6 volts. |
| C3' | 6.8 m.f.d. |
| R5 and R6 | 39K. |
| C4' | 1 m.f.d. |
| R7' | 1.5K. |
| R8' | 39K. |
| R9' | 47K. |
| R10' | 1.5K. |
| C5' | 6.8 m.f.d. |
| M' | Knowles BA-1501. |

Considering more broadly both the circuits of FIGURES 2 and 3, it will be appreciated that the operations explained above result by virtue of the fact the batteries used maintain their voltage characteristics constant over their complete life. Standard mercury cells or so-called "button batteries" do not decay in performance, as such, but instead, retain their operating characteristics until they become completely inoperative. This feature is important to the invention because the maintenance of constant conditions is what permits only the change in temperature to vary the frequency of operation of the respective multi-vibrators.

The use of the simple multi-vibrator type converting means to transform the temperatures into electrical signals, and the use of speaker means to convert such signals to sound, permits minimization of component size plus dependable operation. Moreover, the linearity obtained with the arrangement of FIGURE 3 is particularly advantageous.

While these features have been emphasized immediately above, it should be apparent from this entire specification that all of the objects set forth at the outset have been successfully achieved. Accordingly,

What is claimed is:

1. A method of determining a given parameter within a given environmental area subjected to a varying electrical field, said method comprising the steps of:
    (a) electrically sensing said parameter within said area and producing first electrical signals having a frequency corresponding to the value of the parameter sensed;
    (b) converting said first electrical signals into pressure signals of corresponding frequency;
    (c) transmitting said pressure signals to a location outside said area and removed from said varying electrical field;
    (d) converting said pressure signals transmitted outside said area into corresponding second electrical signals; and
    (e) using said second electrical signals to indicate said value of said parameter sensed.

2. The method defined in claim 1 wherein step (c) is carried out by confining said pressure signals within an enclosed transmission path.

3. The method defined in claim 2 wherein said pressure signals are sound signals.

4. The method defined in claim 1 wherein step (a) is carried out by varying the electrical characteristic of an element to electrically sense said parameter.

5. The method of claim 1 wherein said step (a) is carried out by varying said first electrical signals linearly with variations in said parameter.

6. A method of determining the temperature of a given medium disposed within a high-frequency field, said method comprising the steps of:
    (a) electrically sensing the temperature of said medium within said field and producing first electrical signals having a frequency corresponding to the temperature sensed;
    (b) converting said first electrical signals into pressure signals of corresponding frequency;
    (c) transmitting said pressure signals to a location outside said field;
    (d) converting said pressure signals transmitted outside said field into corresponding second electrical signals; and,
    (e) using said second electrical signals to indicate said temperature sensed.

7. The method defined in claim 6 wherein said step (a) is carried out by varying said first electrical signals linearly with linear variations in the temperature sensed.

8. The method defined in claim 6 wherein said pressure signals are sound signals and wherein step (c) is carried out by confining said pressure signals within an enclosed transmission path.

9. In combination with means providing a high frequency field in a confined area, the improvement in temperature measuring and indicating means comprising:
    (a) sensing means disposed within said field and having a characteristic variable with temperature;
    (b) converting means disposed within said field and connected to said sensing means for producing first electrical signals having a frequency corresponding to variations in said characteristics;
    (c) first transducer means disposed within said field and connected to said converter means for translating said first electrical signals into pressure impulses;
    (d) enclosed electrically non-conductive gas filled tube means having one end located in said field in co-operation with said first transducer means to impart said pressure impulses to the gas within said tube means, said tube means extending outside said field;
    (e) second transducer means outside said field and coupled to the other end of said tube for receiving the impulses from the gas therein and translating the same into second electrical signals; and,
    (f) indicating means responsive to said second electrical signals to indicate the frequency thereof and thereby said temperature.

10. The combination defined in claim 9 wherein said sensing means comprises thermistor means, and wherein said converting means comprises oscillator means having said thermistor means connected therewith to vary the frequency thereof.

11. The combination defined in claim 10 wherein said oscillator means comprises a transistorized multi-vibrator type circuit.

12. The combination defined in claim 10 wherein said oscillator means comprises a pair of transistors, and circuit means connected with said transistors to form a multi-vibrator circuit, said circuit means including thermistor means for varying the frequency of operation of said multi-vibrator circuit.

13. The combination defined in claim 12 wherein said thermistor means comprises a single thermistor connected commonly with the base of said transistors.

14. The combination defined in claim 9 wherein said converting means comprises a free-running astable transistor circuit including a pair of transistors, and said sensing means comprises thermistor means connected in said circuit to control the frequency of operation thereof.

15. The combination defined in claim 14 wherein said circuit includes respective RC networks associated respectively with each of said transistors and wherein said thermistor means comprises in each said network one thermistor.

16. The combination defined in claim 14 wherein said thermistor means is a single thermistor coupled in said circuit to control the base current of both said transistors.

(References on following page)

References Cited by the Examiner

UNITED STATES PATENTS

| | | |
|---|---|---|
| 2,750,794 | 6/1956 | Downs. |
| 2,751,577 | 6/1956 | Du Bois _____ 340—180 X |
| 3,029,642 | 4/1962 | Burhans et al. _____ 73—362 |
| 3,158,027 | 11/1964 | Kibler _____ 73—362 |
| 3,200,351 | 8/1965 | Ritchey _____ 331—113 X |
| 3,205,477 | 9/1965 | Kalbfell _____ 181—0.5 X |
| 3,253,153 | 5/1966 | Stoddard _____ 331—66 X |

FOREIGN PATENTS 790,235  2/1958  Great Britain.

LOUIS R. PRINCE, *Primary Examiner.*

S. H. BAZERMAN, F. SHOON, *Assistant Examiners.*